(12) United States Patent
Gódor et al.

(10) Patent No.: US 10,587,532 B2
(45) Date of Patent: Mar. 10, 2020

(54) TECHNIQUE FOR PROVIDING CONTENT VIA A MOBILE COMMUNICATIONS NETWORK

(71) Applicant: Telefonaktiebolaget LM Ericsson (publ), Stockholm (SE)

(72) Inventors: István Gódor, Budapest (HU); Geza Szabo, Kecskemet (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 150 days.

(21) Appl. No.: 15/033,674

(22) PCT Filed: Dec. 12, 2013

(86) PCT No.: PCT/EP2013/076341
§ 371 (c)(1),
(2) Date: May 2, 2016

(87) PCT Pub. No.: WO2015/086069
PCT Pub. Date: Jun. 18, 2015

(65) Prior Publication Data
US 2016/0277314 A1    Sep. 22, 2016

(51) Int. Cl.
*H04L 12/927* (2013.01)
*H04W 4/18* (2009.01)
(Continued)

(52) U.S. Cl.
CPC ............ *H04L 47/808* (2013.01); *H04W 4/18* (2013.01); *H04W 12/08* (2013.01); *H04W 76/10* (2018.02); *H04W 4/029* (2018.02)

(58) Field of Classification Search
CPC ...... H04L 47/808; H04W 76/02; H04W 4/18; H04W 4/02; H04W 4/20; H04W 12/08
See application file for complete search history.

(56) References Cited

U.S. PATENT DOCUMENTS 6,617,964 B1 *   9/2003  Lamb .................... G01W 1/00
                                                            340/286.02
2009/0067395 A1   3/2009  Curtis et al.
(Continued)

FOREIGN PATENT DOCUMENTS

EP          2688244 A2    1/2014
WO        2012124904 A2    9/2012

OTHER PUBLICATIONS

"LTE RRC Connection Setup Messaging" posted at <http://www.eventhelix.com/lte/attach/LTE-RRC-Connection-Setup-Messaging.pdf> on Dec. 1, 2012.*
(Continued)

*Primary Examiner* — Scott B Christensen
(74) *Attorney, Agent, or Firm* — Coats & Bennett, PLLC

(57) ABSTRACT

A technique of providing content via a mobile communications network to a user terminal is described. A method aspect of this technique comprises assigning, in a connection setup phase initiated by the user terminal, a content access limitation to the user terminal. The content access limitation restricts content access by the user terminal to content predefined on a network side. The method further comprises providing the predefined content to the user terminal. The method may be performed in connection with providing location-dependent information, such as map information, to the user terminal even when the user terminal cannot be authenticated in the mobile communications network.

24 Claims, 6 Drawing Sheets

(51) Int. Cl.
*H04W 12/08* (2009.01)
*H04W 76/10* (2018.01)
*H04W 4/029* (2018.01)

(56) References Cited

U.S. PATENT DOCUMENTS

| | | | | |
|---|---|---|---|---|
| 2010/0197294 A1* | 8/2010 | Fox | ............... | H04W 48/02 |
| | | | | 455/422.1 |
| 2010/0242089 A1* | 9/2010 | Bi | ............... | H04L 63/104 |
| | | | | 726/3 |
| 2011/0093913 A1* | 4/2011 | Wohlert | ............... | H04L 63/101 |
| | | | | 726/1 |
| 2011/0173678 A1* | 7/2011 | Kaippallimalil | ........ | G06F 21/31 |
| | | | | 726/4 |
| 2013/0347028 A1* | 12/2013 | Warrick | ............. | H04L 12/2809 |
| | | | | 725/30 |

OTHER PUBLICATIONS

"Captive portal". Posted at <https://searchmobilecomputing.techtarget. conn/definition/captive-portal> in Aug. 2005 (Year: 2005).*

\* cited by examiner

TECHNIQUE FOR PROVIDING CONTENT VIA A MOBILE COMMUNICATIONS NETWORK

TECHNICAL FIELD

The present disclosure generally relates to mobile communications. In particular, a technique for providing content via a mobile communications network to a user terminal is described. The technique can be implemented in the form of methods, network nodes, devices, and computer program products.

BACKGROUND

Accessing digital content such as Web pages or multimedia files over mobile communications networks has tremendously increased in the last decade. This increase can partially be attributed to the introduction of smartphones, tablet computers and similar types of user terminals with large display areas. At the same time high data throughout capabilities of modern mobile communications networks guarantee a satisfactory user experience when downloading large content volumes.

An important prerequisite for accessing content via a mobile communications network is a pre-established relationship to an operator of the mobile communications network. Such a relationship may manifest itself in the form of a Subscriber Identity Module (SIM) card in the user terminal, in a valid subscription (e.g., a mobile Internet subscription) or roaming agreement, and so on. The pre-established relationship needs to be verified on a network side in a connection setup phase between the user terminal and the mobile communications network. The verification includes authentication and authorization procedures. In case a user terminal cannot be authenticated, or in case it is found that the user terminal is not (sufficiently) authorized, the user terminal will be prevented from accessing content via the mobile communications network.

The requirement of a pre-established operator relationship to access content via a mobile communications network limits usability of conventional mobile communications networks. It would often be desirable to provide content of public interest also to user terminals with no dedicated relationship to an operator of a locally available mobile communications network. As an example, tourists in foreign countries without local knowledge would profit from an easy access to content of public interest, such as a weather forecast, a map of the surrounding area, contact details of a nearby hospital or police office, and so on.

SUMMARY

In the above and other situations, there is a need for a technique that permits efficiently providing content via a mobile communications network to a user terminal.

According to one aspect, a method of providing content via a mobile communications network to a user terminal is provided. The method comprises assigning, in a connection setup phase initiated by the user terminal, a content access limitation to the user terminal. The content access limitation restricts content access by the user terminal to content predefined on a network side. The method further comprises providing the predefined content to the user terminal.

The assigning step may in one variant be performed to differentiate between user terminals with and without content access limitation. Following the differentiation, the predefined content may be provided to user terminals with content access limitation. It should be noted that the assigning step does in some variants not require—on top of the differentiation—a dedicated messaging for user terminals with content access limitation, nor a dedicated marking of user terminals with content access limitation. In other variants, the assigning step may comprise one or both of such messaging and marking.

As such, the assigned content access limitation may or may not include a dedicated marking (e.g., flag setting or data field entry) in a dataset created or maintained for the user terminal (e.g., in a registry). The data set may be generated or maintained within the mobile communications network.

The pre-definition of the content may occur within at least one of the mobile communications network and a data provisioning network coupled to the mobile communications network. The data provisioning network may be an Internet Protocol (IP)-based network external to the mobile communications network. Such IP-based networks are sometimes also referred to as Packet Data Networks (PDNs).

The content access limitation may be assigned to the user terminal in various ways. As an example, the content access limitation may be assigned responsive to determining in the connection setup phase that the user terminal cannot be authenticated by the mobile communications network (e.g., because of a missing pre-established relationship to an operator of the mobile communications network). Additionally, or as an alternative, the content access limitation may be assigned responsive to determining in the connection setup phase that the user terminal has no authorization for unlimited content access (e.g., because there does not exist a mobile Internet subscription).

In a further, alternative or additional variant, the content access limitation may be assigned to the user terminal responsive to receiving in the connection setup phase a content access limitation indicator from the user terminal. The indicator may be signalled in a Radio Resource Control (RRC) message received in the connection setup phase from the user terminal. As an example, the indicator may be signalled in a dedicated Information Element (IE) or a dedicated setting of an IE within the RRC message. Additionally, or as an alternative, the indicator may be signalled in a Random Access (RA) preamble received in the connection setup phase from the user terminal. To this end, a dedicated RA preamble may be reserved for signalling of the content access limitation indicator.

The content access limitation indicator may be devoid of any specification of particular content to be provided to the user terminal. As an example, the indicator may take the form of a generic indication (e.g., an IE setting) not hinting at or otherwise identifying a particular content. In another variant, the method may comprise receiving a dedicated request specifying content to be provided to the user terminal. As an example, such a request may be received after the connection setup phase from the user terminal. In response to receipt of the content request, the method may further comprise retrieving or requesting retrieval of predefined content matching the predefined content for provision to the user terminal. In one example, a node of the mobile communications networks requests content retrieval from a data provisioning network.

The connection setup procedure may pertain to the setup of a packed-switched or circuit-switched connection. In particular, the connection setup procedure may pertain to a PDN connection setup. In such a case, assigning the content access limitation to the user terminal may comprise allocating or triggering allocation of a dedicated PDN or a dedicated PDN function to the user terminal. The allocation or the triggering of the allocation, in turn, may comprise notifying a gateway node interfacing one or more PDNs of the content access limitation underlying the PDN connection setup for the user terminal. The dedicated PDN may be configured to provide only the predefined content to the user terminal. Additionally, or as an alternative, the dedicated PDN function may be a filter that can only be passed by the predefined content.

Assigning the content access limitation to the user terminal may further comprise allocating a dedicated bearer type to the user terminal. The dedicated bearer type may or may not be configured to enforce a connectivity limitation. A connectivity limitation may also be allocated to the user terminal independently from the allocation of the dedicated bearer. As such, assigning the content access limitation to the user terminal may generally comprise allocating to the user terminal a connectivity limitation (e.g., to restrict one or more of a Quality of Service, a bandwidth, a data volume, and a usage duration).

The predefined content may be provided to the user terminal via one or more broadcast (BC) messages. In a BC implementation, the predefined content may be provided simultaneously to multiple user terminals attached to the mobile communications network and to which a content access limitation is assigned. In such a case the predefined content will not be terminal-specific. As will be understood, in other implementations the predefined content will be terminal-specific.

The BC messages may generally be messages defined by a messaging service, including a Short Message Service (SMS) and a Multimedia Message Service (MMS). As an example, the BC messages may conform to the SMS-BC protocol.

As stated above, the predefined content may in one variant be provided via a circuit-switched connection. To this end, an automated voice service (optionally with automated calling by, e.g., a bot) may be used.

The method may further comprise determining a location of the user terminal. The location may be determined by the mobile communications network or by the user terminal (and may optionally be communicated to the mobile communications network or a data provisioning network behind the mobile communications network). The location of the user terminal may be determined based on one or more of satellite positioning system data (e.g., Global Positioning System, GPS, data) available for the user terminal, cell data (e.g., a cell identifier) of the mobile communications network pertaining to the user terminal, and address data of the mobile communications network (e.g., a Medium Access Control, MAC, address of an access point of the mobile communications network).

The predefined content provided to the user terminal may comprise content indicative of or selected based on the location. As an example, content indicative of the location may comprise map data. As a further example, content selected based on the location could relate to location-dependent services (including, for example, information pertaining to nearby restaurants and hospitals, but also a weather forecast).

Generally, the predefined content may be independent from the location of the user terminal, or it may be location-dependent. The predefined content may generally be content of public interest. The predefined content may be provided in the form of particular Web pages (e.g., defined by governmental bureaus), map data, public warnings, a weather forecast, and information pertaining to nearby services.

According to a further aspect, a method of receiving content via a mobile communications network at a user terminal is provided. The method comprises triggering, in a connection setup phase initiated by the user terminal, assignment of a content access limitation to the user terminal. The content access limitation restricts content access by the user terminal to content predefined on a network side. The method further comprises receiving the predefined content via the mobile communications network.

As stated above, the assignment of the content access limitation may be triggered in various ways, for example by transmitting a content access limitation indicator (e.g., in a RRC message or a RA preamble) from the user terminal to the mobile communications network. The indicator may be transmitted by the user terminal responsive to receipt of a user interaction signal requesting or confirming the predefined content. The user interaction signal may be received prior to or during the connection setup phase.

Also provided is a computer program product comprising program code portions for performing the steps of any of the methods and method aspects disclosed herein when the computer program product is executed on one or more devices or one or more network nodes. The computer program product may be provided in the form of a data signal or may be stored on a computer-readable recording medium such as a DVD, CD-ROM or semiconductor memory.

Also provided is a network node or network node system for providing content via a mobile communications network to a user terminal. The node or node system may comprise a processor adapted to assign, in a connection setup phase initiated by the user terminal, a content access limitation to the user terminal. The content access limitation restricts content access by the user terminal to content predefined on a network side. The node or node system further comprises an interface adapted to provide the predefined content to the user terminal.

The network node or network node system may be comprised by the mobile (e.g., cellular) communications network. As an example, the network node may take the form of a base station of the mobile communications network. In other variants, the network node system may comprise two or more nodes of the mobile communications network (e.g., a base station and a gateway node). Still further, the network node system may comprise one or more nodes of the mobile communications network and one or more further nodes of a data provisioning network (e.g., a PDN node).

Also provided is a user terminal for receiving content via a mobile communications network. The user terminal comprises a processor adapted to trigger, in a connection setup phase initiated by the user terminal, an assignment of a content access limitation to the user terminal. The content access limitation restricts content access by the user terminal to content predefined on a network side. The user terminal also comprises an interface adapted to receive the predefined content via the mobile communications network.

The user terminal may be a mobile or a stationary terminal. As an example, the user terminal may take the form of a mobile telephone, a smartphone, a tablet computer or a notebook.

BRIEF DESCRIPTION OF THE DRAWINGS

In the following, the present disclosure will be described in more detail with reference with exemplary embodiments illustrated in the drawings, wherein.

DETAILED DESCRIPTION

In the following description, for purposes of explanation and not limitation, specific details are set forth, such as specific device and system configurations and specific methods, steps and functions. Those details are set forth in order to provide a thorough understanding of the technique presented herein. It will be appreciated that the technique may be practiced in other embodiments that depart from these specific details. Specifically, it will be appreciated that the technique presented herein could be implemented in connection with any cellular or non-cellular mobile communications standard. Exemplary cellular standards include the Global System for Mobile communications GSM, the Universal Mobile Telecommunications System (UMTS) and the Long Term Evolution (LTE) standards.

Those skilled in the art will further appreciate that the methods, steps and functions described herein can be implemented using individual hardware circuitry, using software functioning in conjunction with a programmed processor or general purpose computer, using one or more Application Specific Integrated Circuits (ASICs), one or more Digital Signal Processors (DSPs) and/or one or more Field Programmable Gate Arrays (FPGAs). It will also be appreciated that the technique disclosed herein may be embodied in a processor and a memory coupled to the processor, wherein the memory stores one or more programs that cause the processor to perform the methods, steps and functions described herein.

Figure 1:
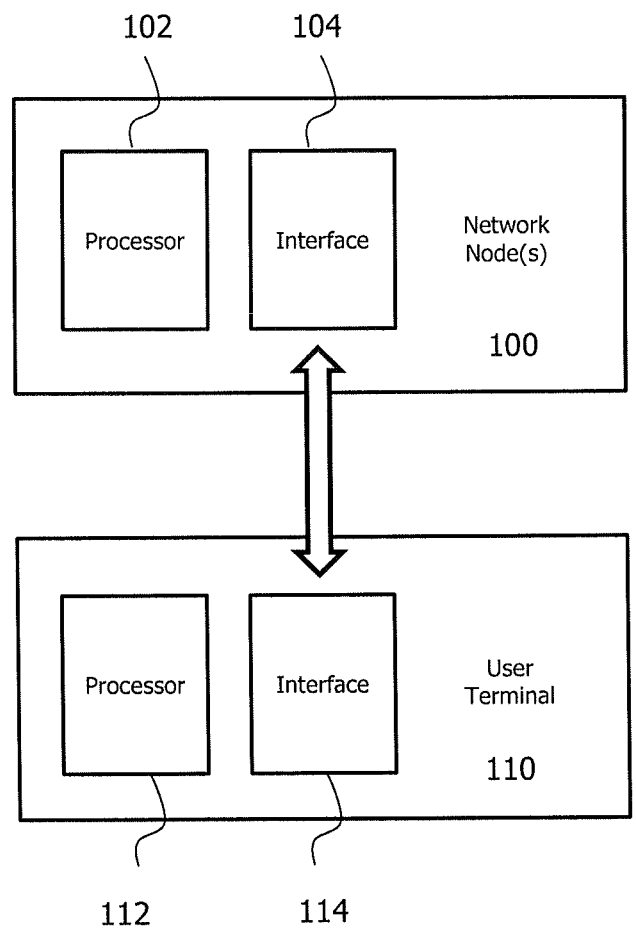
FIG. 1 schematically illustrates an embodiment of a user terminal and an embodiment of a network node for providing content to the user terminal.

FIG. 1 schematically illustrates embodiments of a network node or set of such nodes 100 and of a user terminal 110 to which digital content is provided by the network node(s) 100 via a mobile communications network. It should be noted that the mobile communications network is not explicitly shown in FIG. 1. In certain implementations, the network node 100 may belong to the mobile communications network. In such implementations, the network node 100 may be included in an access network portion of the mobile communications network.

As shown in FIG. 1, the network node 100 comprises a processor 102 and an interface 104. It should be noted that in certain variants the processor 102 and the interface 104 could be implemented on two different network nodes. In a similar manner, also the user terminal 110 comprises a processor 112 and an interface 114. The network node(s) 100 and the user terminal 110 will comprise further software and hardware components not illustrated in FIG. 1. As an example, both the network node(s) 100 and the user terminal 110 will each comprise a memory for storing program code that controls operations of the respective processor 102, 112.

As said, the network node(s) 100 provide(s) content via a mobile communications network to the user terminal 110. In turn, the user terminal 110 receives the content via the mobile communications network from the network node(s) 100. The content may generally be content of public interest. As an example, the content may comprise one or more of map data, information pertaining to locally available services, Web pages, public warnings and a weather forecast. It will be appreciated that the provided content can generally be dependent on a location of the user terminal 100.

The processor 112 of the user terminal 110 is adapted to trigger, in a connection setup phase with the mobile communications network initiated by the user terminal 110, an assignment of a content access limitation to the user terminal 110. As will be described in more detail below, the content access limitation restricts content access by the user terminal 110 to content predefined on the network side (e.g., via an operator setting in the mobile communications network and/or in a data provisioning network coupled to the mobile communications network). The processor 102 of the network node(s) 100 is adapted to assign, in the connection setup phase, the content access limitation to the user terminal 110.

The interface 104 of the network node(s) 100 is adapted to provide the predefined content from the network node(s) 100 to the user terminal 110. The interface 114 of the user terminal 110 is adapted to receive that content. It should be noted that the interface 114, or another interface of the mobile terminal 100, may further be configured for signalling in the connection setup phase, including for example at least one of RA signalling and RRC signalling. In a similar manner, the interface 104 of the network node(s) 100, or another interface thereof, may be configured for signalling in the connection setup phase.

In the following, the operation of the network node(s) 100 and the user terminal 110 will be described in more detail with reference to the schematic flowchart 200 of FIG. 2. Specifically, the flow chart 200 illustrates method steps performed by the mobile terminal 110 on the one hand and method steps performed by the network node(s) 100 on the other hand.

Figure 2:
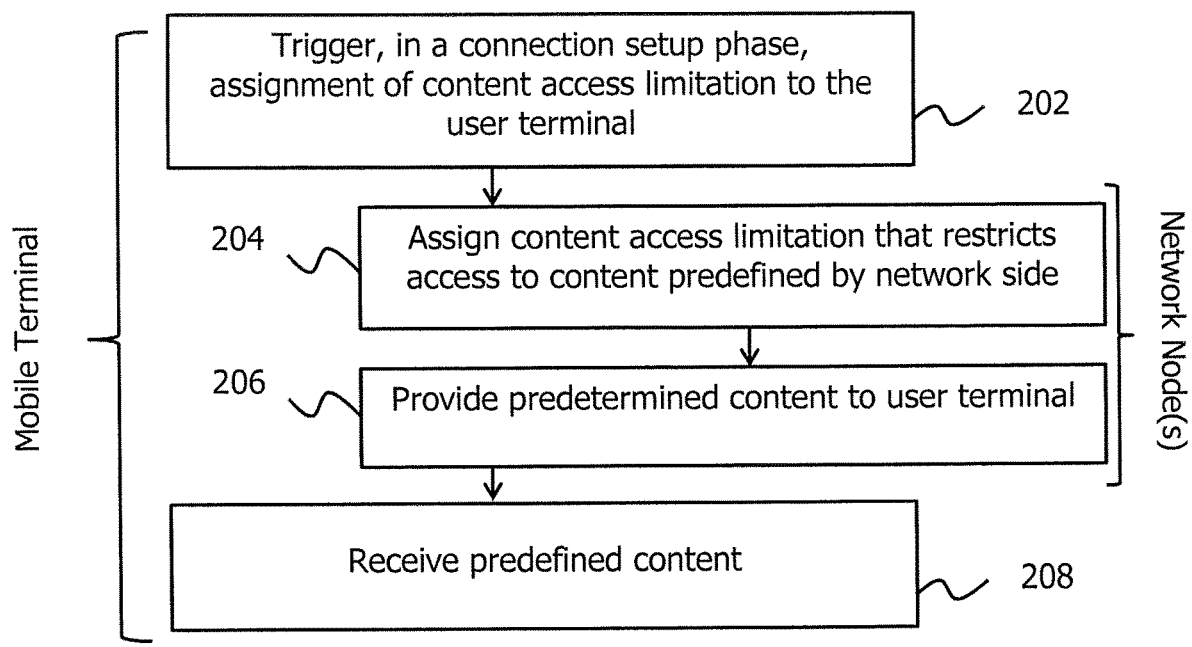
FIG. 2 shows a flow chart of a method embodiment for providing content via a mobile communications network to a user terminal.

As shown in FIG. 2, the mobile terminal 110 triggers in step 202 assignment of a content access limitation to the mobile terminal 110. The triggering step 202 is performed in a connections setup phase in which a connection to the mobile communications network is established. The connection setup phase is initiated by the user terminal 110 prior to or during the triggering step 202. In one variant, the connections setup phase is started by RA signalling towards the mobile communications network. It will be appreciated that depending on the nature of the mobile communications network also other signalling mechanisms could be implemented for initiating the connection setup phase.

The triggering step 202 can be performed in various ways. As an example, the user terminal 110 may signal a content access limitation indicator to the network node(s) 100 for triggering assignment of the content access limitation to the user terminal 110. It will be appreciated that such an explicit indicator signalling could be omitted in other variants. For example, assignment of the content access limitation could alternatively be triggered by the user terminal 110 initiating the connection setup without proper authentication or authorization.

In response to the user terminal 110 triggering assignment of a content access limitation in step 202, the network node(s) 100 assign(s) a content access limitation to the user terminal 110 (step 204). The content access limitation restricts access by the user terminal 110 to content predefined by the network side (e.g., by the mobile communications network via an operator setting). The assignment step 204 may comprise or result in a differentiation between a first type of user terminals having unlimited content access (e.g., because of a regular mobile Internet subscription) and a second type of user terminals, such as the user terminal 110, to which a content access limitation is assigned (e.g., because of no mobile Internet subscription, no roaming agreement, and so on). An exemplary differentiation procedure in this regard will be explained in more detail below with reference to FIG. 3.

The content access limitation may be assigned in multiple ways. As an example, a data record or a message created and/or maintained for the user terminal 110 by the network node(s) 100 or any other network node (e.g., within the mobile communications network) may be provided with a respective setting (e.g., a flag). Additionally, or as an alternative, the assignment step 204 may comprise notifying one or more network nodes attached to the network node(s) 100 of the fact that a content access limitation is assigned to the particular user terminal 110. Such a notification may comprise a transmission of a dedicated notification message or a corresponding marking within a conventional message.

In a further step 206, predetermined content is provided to the user terminal 110 to which the content access limitation has been assigned. It should be noted that the provisioning step 206 may automatically be performed in response to the assignment step 204 (and/or in response to the triggering step 202) or, alternatively, in response to a dedicated content request received by the network node(s) 100 after the triggering step 202. The content request may specify the content that is to be provided to the user terminal 110. In such a case the network node(s) 100 may retrieve, or request retrieval of, predefined content matching the specified content for provision to the user terminal 110.

Then, in step 208, the predefined content is received by the mobile terminal 110 from the network node(s) 100 and via the mobile communications network. As will be described in more detail below, the predefined content could be received in various ways, for example by a unicast connection or a BC message. It will be appreciated that in a BC scenario the same predefined content will potentially be received by multiple mobile terminals via the associated mobile communications network.

Figure 3:
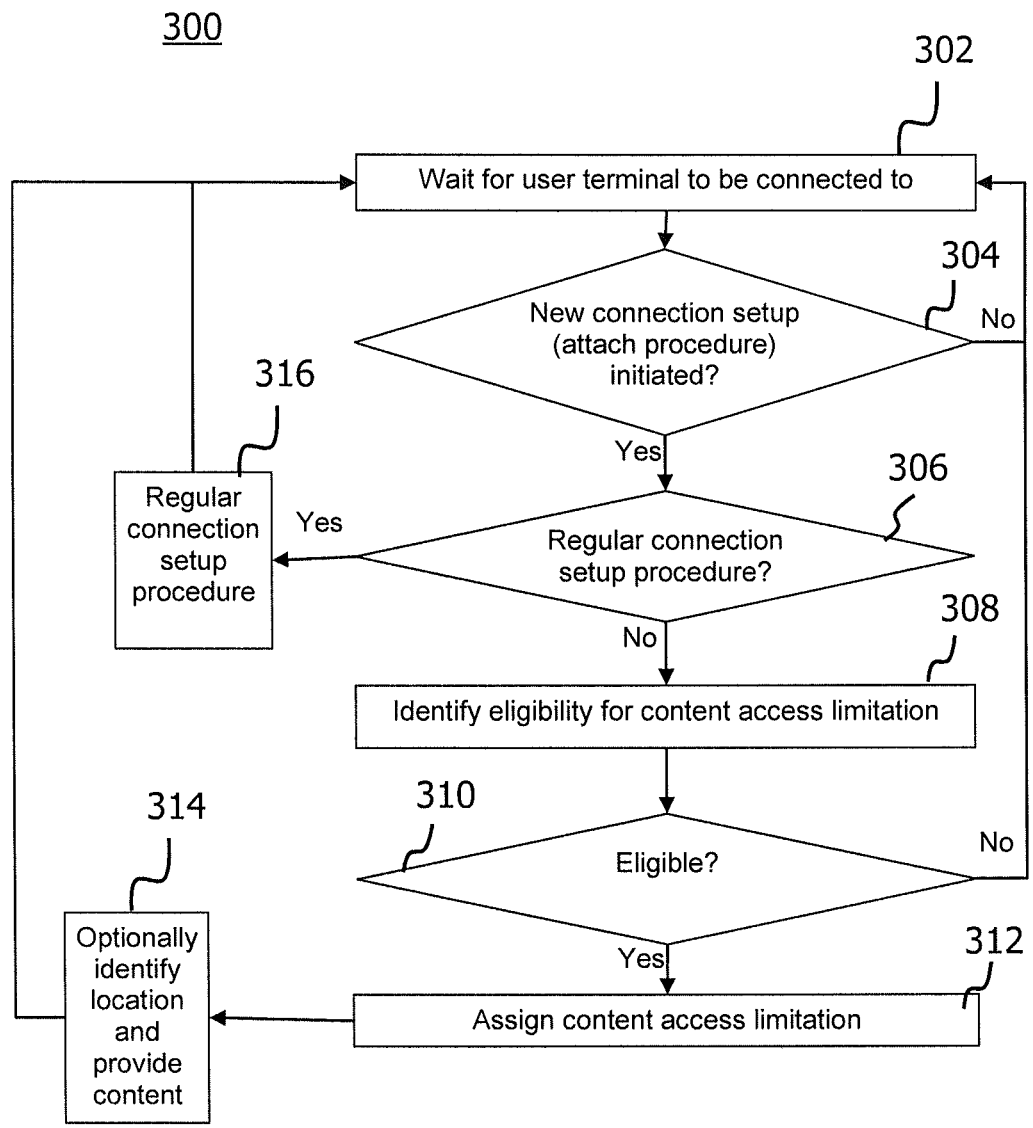
FIG. 3 schematically illustrates a flow chart of a further method embodiment.

In the following, the operation of the network node(s) 100 will be described in more detail with reference to the schematic flow chart 300 of FIG. 3. Specifically, certain operational steps preceding the assignment step 204 of FIG. 2 will be discussed. As such, the steps illustrated in FIG. 3 could be performed in connection with the steps discussed above in connection with FIG. 2.

In an initial step 302, the network node(s) 100 waits for user terminals to be connected to the mobile communications network. In step 304 it is determined whether or not a connection setup (e.g., a new attach procedure) is initiated. Initiating a connection setup may comprise receiving a connection setup request from the user terminal 110 (e.g., an RA message and, optionally, subsequent RRC signalling). Generally, the connection setup procedure may be directed to a circuit-switched (e.g., voice) connection or a packet-switched connection. In this regard, it may, for example, be determined in step 304 whether or not a new PDN connection setup is to be initiated.

From step 304 the method loops back to step 302 as long as no new connection setup is initiated. On the other hand, once the network node(s) 100 determine(s) that a mobile terminal 110 has initiated a new connection setup, the method proceeds to step 306. Step 306 basically serves for differentiating between user terminals having unlimited content access on the one hand and user terminals having a content access limitation As such, the differentiation in step 306 results in an (implicit) assignment of a content access limitation by way of the differentiation. As such, step 306 may correspond to step 204 in FIG. 2. It should be noted that step 306 is performed during the connection setup phase initiated in step 304.

If it is determined in step 306 that the connection setup is initiated for a user terminal with unlimited content access, a regular connection setup procedure is performed in step 316, and the method loops back to step 316. It will be appreciated that the details of the regular connection setup procedure in step 316 depend on the nature of the mobile communications network for which the connection setup was requested.

On the other hand, if it is determined in step 306 that no regular connection setup procedure can be initiated, for example because the user terminal 110 cannot be authenticated or does not possess sufficient authorization for unlimited content access, or because the presence of a content access limitation indicator (e.g., in the connection setup request) is detected, the method proceeds to an optional step 308. In step 308 it is determined whether the user terminal 110 is eligible for receiving content under the regime of a content access limitation. In this regard various details underlying the connection setup request by the mobile terminal 110 may be evaluated.

Details that may be evaluated in this regard may include (e.g., technical) capabilities of the user terminal 110. Additionally, or as an alternative, the connection setup request may be analysed (e.g., with respect to the requested information, an underlying authentication or authorization, or otherwise).

Depending on the eligibility of the user terminal 110 (e.g., of its connection setup request), the method loops back from step 310 to step 302 (non-eligible user terminal) or proceeds to step 312 (eligible user terminal). In case of non-eligibility, the user terminal 110 may be notified accordingly.

In an optional step 312 an explicit content access limitation is assigned to the user terminal 110 (e.g., in a data set maintained for the user terminal 110 in a registry). In certain implementations step 312 may be omitted since the differentiation in step 306 will already assign the user terminal 110 to a content access limitation "path" in the flow chart 300 of FIG. 3. Step 312 may correspond to step 204 described above with reference to FIG. 2.

From step 312 the method proceeds to step 314. In step 314, the network node(s) 100 provide(s) the predetermined content to the user terminal 110. As such, step 314 may correspond to step 206 described above with reference to FIG. 2.

In one optional implementation, the location of the user terminal 110 is identified in step 314. The location of the user terminal 110 can be determined in various ways. As an example, the user terminal 110 may provide data (e.g., geographic coordinates) derived using a satellite positioning system to the network node(s) 100 for that purpose. Alternatively, the network node(s) 100 may autonomously determine the location of the user terminal 110 for example from cell data of the mobile communications network to which the connection setup has been initiated (which assumes that the mobile communications network is a cellular network).

According to another variant, and especially for a non-cellular mobile communications network, address data of an access node of the mobile communications network may be evaluated in this regard. Once the location of the user terminal 110 has been identified in step 314, predefined content pertaining to location-based services (e.g., navigation services, a public warning, etc.) may be provided to the user terminal 110.

In the following, the operation of the network node(s) 100 and the user terminal 110 will be described with reference to the exemplary LTE communication standard and the associated Evolved Packet System (EPS) network architecture. It will be appreciated that the technique presented hereinafter can be practiced in connection with other mobile communications standards and other network architectures.

Figure 4:
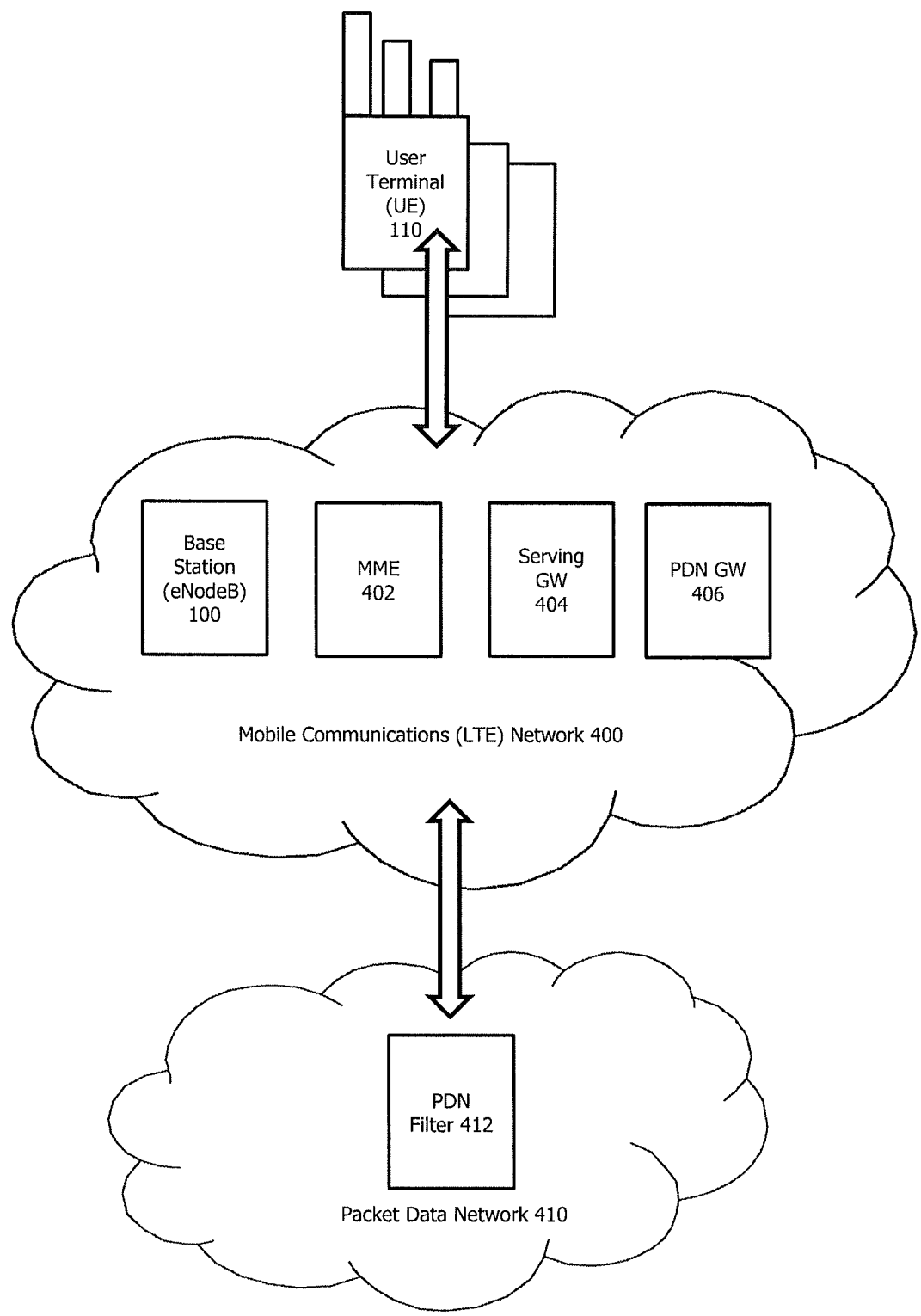
FIG. 4 schematically illustrates a network system embodiment.

FIG. 4 illustrates a network system comprising multiple user terminals 110 (also called User Equipment, UE, in the LTE terminology), an LTE network 400 and a PDN 410 coupled to the LTE network 400. As shown in FIG. 4, the LTE network 400 comprises a base station (also called eNodeB in the LTE terminology) 100, a Mobility Middleware Entity (MME) 102, a Serving Gateway (GW) 404 and a PDN GW 406. The PDN 410 comprises an optional PDN filter 412. While FIG. 4 illustrates an exemplary LTE implementation of the technique described herein, it will be appreciated that this technique could also be implemented in a Third Generation network, such as an UMTS network. In such a case, the PDN GW may be realised by a Gateway GPRS Support Node (GGSN), and so on.

The eNodeB 100 of FIG. 4 is part of an LTE access network. An LTE air interface stretches between the eNodeB 100 and the UE 110. With reference to FIG. 1, this air interface may terminate at the interface 104 on the side of the eNodeB 100 and at the interface 114 on the side of the UE 110.

The MME 402 is in charge of control plane handling. Specifically, the MME 402 handles signalling related to mobility and security for UE network access. The MME 402 is also responsible for tracking and paging the UE 110 in an idle mode and represents the termination point of the Non-Access Stratum (NAS).

The Serving GW 404 and the PDN GW 406 deal with the user plane. Specifically, they are in charge of transporting packet data traffic between the UE 110 and the PDN 410. The Serving GW 404 serves the UE 110 by routing the incoming and outgoing packets (typically IP packets). It is the anchor point for intra-LTE mobility (i.e., in case of a handover between different eNodeBs) and between LTE and other 3GPP network accesses. The serving GW 404 is logically connected to the PDN GW 406.

The PDN GW 406 is the point of interconnect between the LTE network 400 and the external PDN 410. The PDN GW 406 routes packets to and from the PDN 410. The PDN GW 406 also performs various functions such as IP address/IP prefix allocation with policy control and charging. It should be noted that in practise the Serving GW 404 and the PDN GW 406 may be combined in a single hardware entity.

As illustrated in FIG. 4, the PDN 410 comprises a PDN filter 412. The PDN filter 412 is basically in charge of content filtering such that only predefined content can find its way from the PDN 410 towards the UE 110. It should be noted that the PDN filter 412 could alternatively, or in addition, be integrated into the PDN GW 406 or another node of the LTE network 400.

In the following, the operations of the UE 110 and of the various network nodes illustrated in FIG. 4 will be described in more detail with respect to the basic operations underlying a PDN connection setup as illustrated in the signalling diagram 500 of FIG. 5. It should be noted that the signalling illustrated in FIG. 5 can be realized in connection with any one of the method embodiments illustrated in FIGS. 2 and 3, or other method embodiments.

Figure 5:
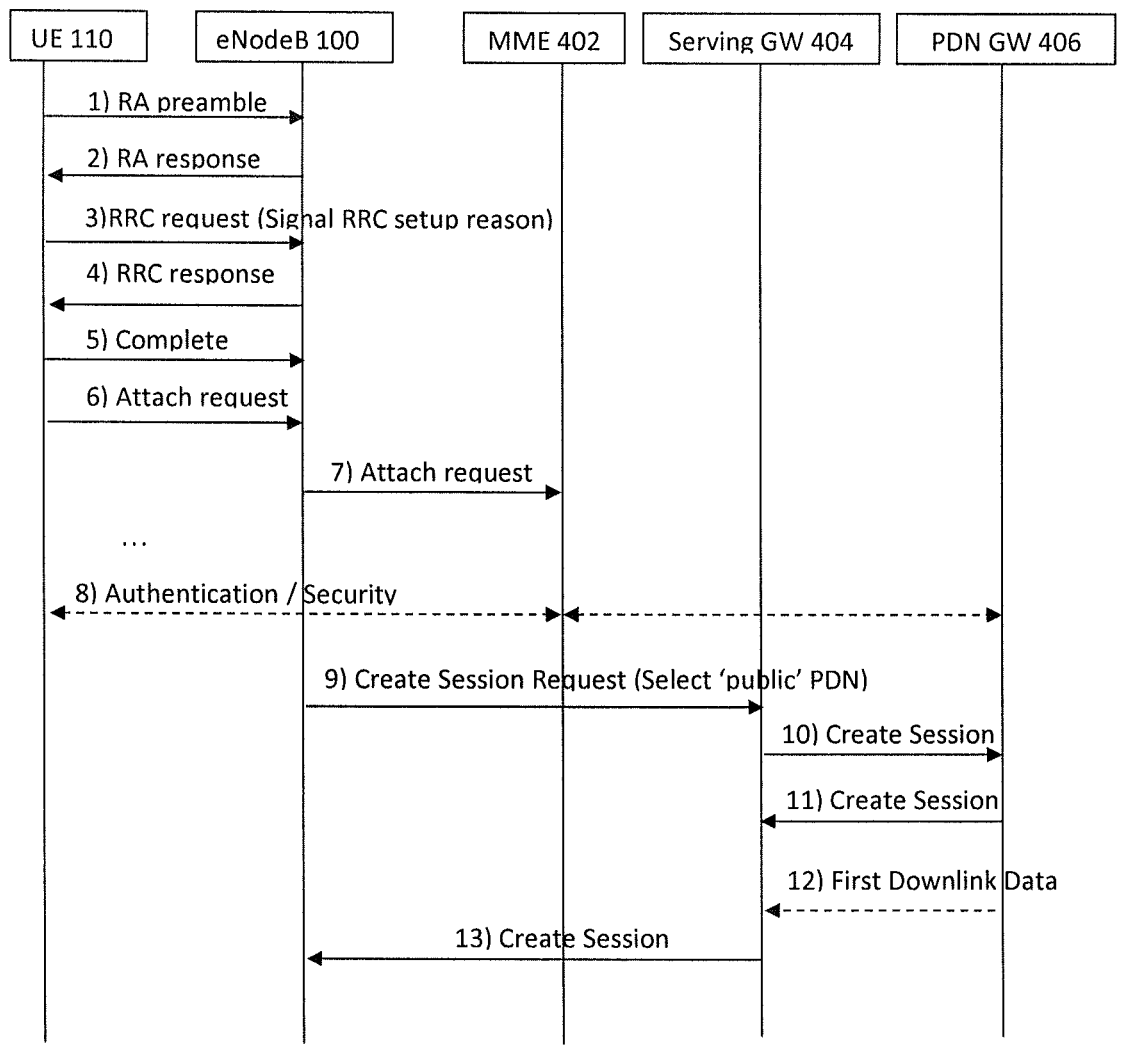
FIG. 5 is signalling diagram schematically illustrating the messages exchanged among a user terminal and various network nodes in connection with a further method aspect.

As shown in FIG. 5, the PDN connection setup is initiated in a first signalling step in which an RA preamble is transmitted from the UE 110 to the eNodeB 100. Successful receipt of the RA preamble is answered by an RA response from the eNodeB 100 to the UE 110 in a second signalling step. In one implementation, the UE 110 may use a dedicated RA preamble reserved for triggering assignment of a content access limitation to the UE 110. In other words, when the eNodeB 100 detects the reserved RA preamble (i.e., which constitutes a dedicated content access limitation indicator), the eNodeB 100 infers that the UE 110 is to be treated in a special manner (see FIGS. 2 and 3).

In a third signalling step, the UE 110 transmits an RRC request message to the eNodeB 100, and the eNodeB 100 responds with a corresponding RRC response message in a fourth signalling step. In one embodiment, the assignment of a content access limitation to the UE 110 is triggered via the RRC request message in the third signalling step (e.g., as an alternative to the use of a reserved RA preamble described above).

As is well known, an RRC connection request message typically includes various IEs. One of these IEs signals the cause for the UE 110 for requesting establishment of the PDN connection. This IE may, for example, conventionally signal an emergency, a high priority access, a mobile terminating access, and so on. In one realization the signalling via that IE is be extended so as to convey a content access limitation indicator from the UE 110 to the eNodeB 100. The indicator thus defines a special access type limited to obtaining entitled information of public interest (i.e., predefined content).

As will be explained in more detail below, the presence of the particular IE (or IE setting) may result in that a special bearer type is allocated to the UE 110. Additionally, or as an alternative, filtering by the PDN filter 412 may then be enabled (e.g., Web filtering) to limit the usage to the information of public interest as a universal service. As such, assigning the content access limitation to the UE 110 may comprise activating the PDN filter 412 for packet traffic terminating at the UE 110. The PDN filter 412 could be realized to filter Web pages on the basis of a black list or white list principle, or in other ways.

As understood herein, a universal service refers to the practice of providing a baseline level of services to every resident (e.g., of a township or country). As such, the technique disclosed herein may be implemented to provide access to information of public interest under the universal service regime.

Referring again to FIG. 5, in further signalling steps a Complete message as well as an Attach request message are sent from the UE 110 to the eNodeB 100 in fifth and sixth signalling steps, respectively. The Attach request message is forwarded by the eNodeB 100 in a seventh signalling step to the MME 402. Further signalling steps may follow before, in a state marked as 8) in FIG. 5, an authenticated and secure relationship is established among the UE 110 and the MME 402 (and among the MME 402 and the PDN GW 46).

It should be noted that in certain embodiments, no explicit content access limitation indicator may be transmitted from the UE 110 to the eNodeB 100 in the RA preamble (first signalling step) and/or in the RRC request message (third signalling step). Rather, the content access limitation may alternatively be assigned to the UE 110 upon determining by the eNodeB 100 and/or the MME 402 that the UE 110 cannot be authenticated and/or does not have sufficient authorization (e.g., no roaming contract or no mobile Internet subscription) for unlimited content access via the PDN GW 46.

The fact that a contact access limitation is assigned to the UE 110 may be propagated in the PDN connection setup procedure. Specifically, in a Create Session request message transmitted in a ninth signalling step from the eNodeB 100 to the serving GW 404, the content access limitation may be signalled also. The content access limitation may thus be taken into account when creating a PDN session in further signalling steps between the serving GW 404 and the PDN GW 412 (tenth and eleventh signalling steps in FIG. 5). In this regard, a dedicated PDN GW 406 (e.g., incorporating the PDN filter 412) or even a dedicated PDN 410 may be selected. In this regard, the LTE network 400 may automatically assign user terminals not authorized (or not authenticated) for regular Internet access to the "public" PDN 410 by controlling the access at the NAS signalling.

In a twelfth signalling step, first downlink data is signalled from the PDN GW 412 to the serving GW 404, and the serving GW 404 creates a session in a thirteenth signalling step to the eNodeB 100.

When creating a new session, a dedicated bearer type may be allocated to the UE 110 with content access limitation. This dedicated bearer type may enable the provision of limited connectivity to the UE 110 which would normally not be allowed to use data services in the LTE network 400 at all. For example, the limited connectivity may relate to a throughput limitation or a time limitation (i.e., limited usability duration) in addition to the limitation to access predefined content only. The corresponding connectivity limitation as well as the limitation pertaining to the predefined content can be implemented in the core network were network operators can enforce corresponding rules and filter traffic from or to the PDN 410.

In the packet-switched PDN scenario illustrated in FIGS. 4 and 5, the predefined content could be limited to a default Web page or a set of default Web pages. As a further option for providing the predefined content to the user terminal 110 in the PDN scenario, broadcast methods on the application layer could be implemented (e.g., channel-wide messages on a chat room, posting on a Facebook wall, Twitter messages, etc.).

Some compact information can also be distributed via broadcast messages of a message service, such as SMS-CB. Moreover, if the capabilities of the UE 110 are limited to accepting circuit-switched calls, a possible broadcast service could also be the calling of such user terminals by a bot, possibly followed by an automated voice recording. If a user identification step is added to the method embodiments discussed above, then the requested content could also be sent just to the given UE 110 (e.g., via SMS).

In one variant, the predefined content may comprise, be enriched with or be selected based on the location of the user terminal 110. In the following, various use case scenarios in this regard will be presented.

As has been explained above, the location of the user terminal 110 can be identified based on satellite positioning system data received from the user terminal 110. Alternatively, or in addition, when the mobile communications network is a cellular network, such as the LTE network 400 illustrated in FIG. 4, cell identifiers can be used to that end, including codes such as the country code, the location area code, the operator code, or the cell ID quartet. In other cases, and in particular for non-cellular mobile communication networks, address information pertaining to the node at which connection setup is performed or requested can be exploited. As an example, the MAC address of the Access Point (AP) may be used to determine the location of the mobile terminal 110.

It should be noted that from the network point of view, the cell level location of the user terminal is known even when the user terminal 110 has no active PDP context. No active data session is needed to the operator network in this regard. In a cellular mobile communications network, the cell where the user terminal 110 initiates the RA procedure identifies the location of the user terminal 110 typically with enough granularity for formulating a location dependent reply to the user terminal 110.

In general, the identified location of the user terminal 110 may be used to tailor the predefined content to be provided to the user terminal 110 such as a map portion of an area surrounding the user terminal 110, a weather forecast for the area in which the user terminal 110 is located, an address, Web page or phone number of a nearest public service (e.g., pharmacy, doctor on duty or police department). All such predefined data could be collected (e.g., with the help of governmental bureaus) and stored in the mobile communications network (e.g., in a central node or in a distributed manner locally at base stations).

With respect to the embodiment of providing predefined content in the form of map data to the user terminal 110, the surrounding area of the user terminal 110 (e.g., the surrounding area of the actual cell serving the user terminal 110) can be provided. The map data may be provided in a memory efficient vector format. As an example, OpenStreetMap uses a topological data structure of four elements including nodes (stored as coordinate pairs of latitude and longitude), ways (ordered lists of nodes), relations and tags. This map data may be considered as navigation services. It should be noted that the actual (e.g., GPS) coordinates of the user terminal 110 are only required for the user terminal 110 itself to depict the current location of the user terminal 110 on the map generated by the user terminal 110 based on the received map data.

Figure 6:
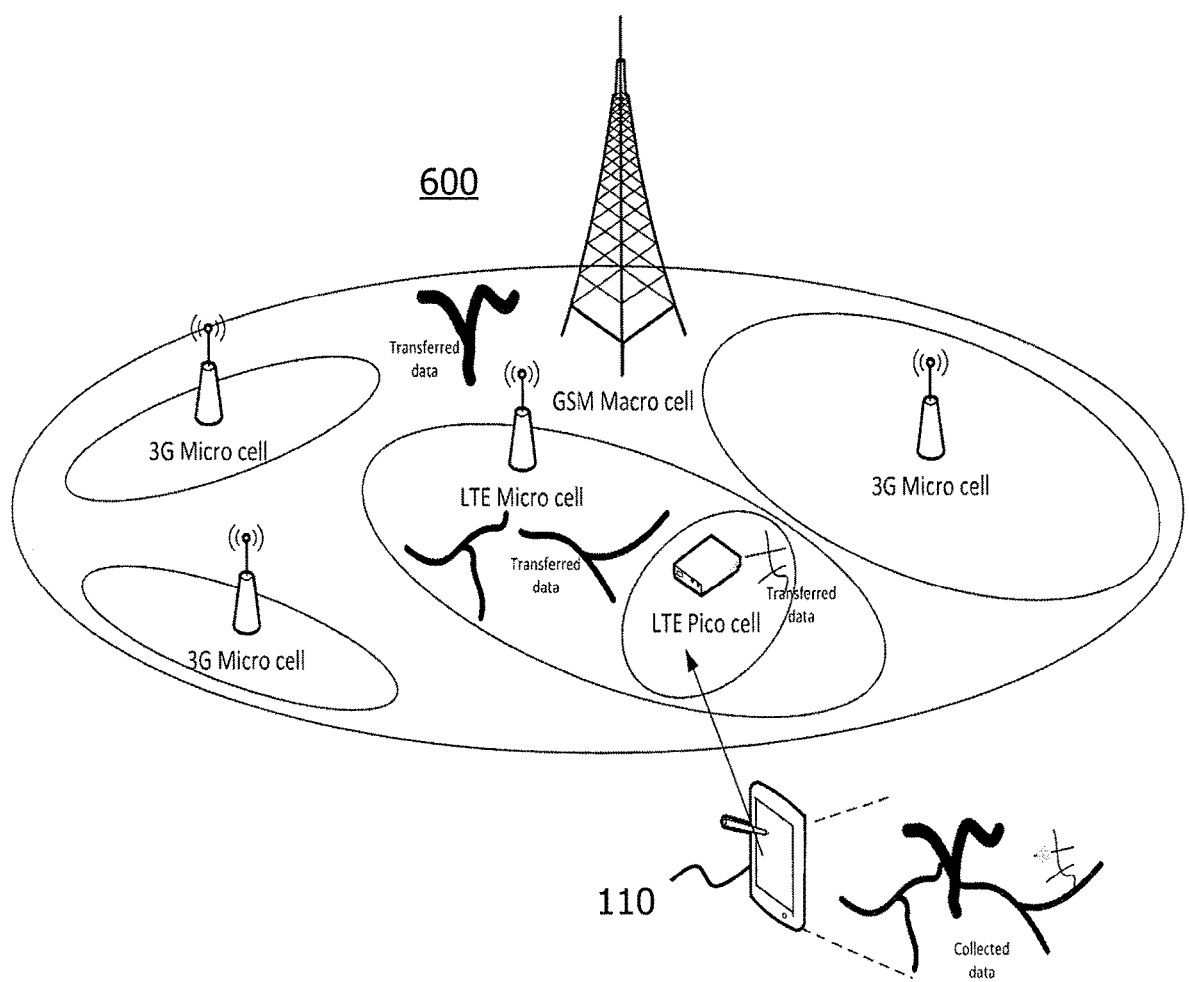
FIG. 6 is a schematic diagram illustrating an embodiment of providing predefined content in the form of map elements to a user terminal.

In heterogeneous networks of different cell sizes or covered areas, different network layers or network portions can provide different levels of details regarding the surrounding area. As shown in FIG. 6, a large marcro-GSM cell can provide very high level information, sending only the main routes (and, optionally, associated street names). Smaller UMTS ("$3^{rd}$ Generation", 3G), LTE ("$4^{th}$ Generation", 4G), micro, pico and femto cells may sent increasingly detailed (and optionally even indoor level) map data. This various map data layers may then be mapped onto each other by the user terminal 110 to generate a detailed map.

To provide the user terminal 110 with map data of the surrounding area, the various cells of FIG. 6 may broadcast the map data (e.g., in a memory efficient vector format). The map data may be broadcast all the time to user terminals (such as user terminal 110) within the coverage area. Specifically, map data broadcast can also be performed without any explicit requests from the user terminals in an uplink direction (e.g., at least as long as a content access limitation has been assigned as discussed above). In such a case, the map data is available also for user terminals that do not have an active PDP context in the given mobile communications network. The messages used for broadcasting the map data may be generated using an available cell BC mechanism.

As has become apparent from the above description of exemplary embodiments, the technique presented herein permits the distribution of predefined content such as publicly available information even to user terminals that cannot be authenticated or otherwise have insufficient authorization within a mobile communications network. The predefined content can be provided to such user terminals via access to a dedicated PDN or via broadcast messages such as SMS-CB. Connectivity limitations can be enforced to keep the network load below in connection with distributing the predefined content. The technique presented herein can be implemented without the need to setup calls, send SMSs or have an active data subscription. In certain implementations, there is not even the requirement for a SIM card in the mobile terminal.

While the present inventions has been described with respect to exemplary embodiments, it will be appreciated by those skilled in the art that the embodiments can be modified and extended in a various ways. Accordingly, the scope of the present invention is only limited by the claims that follow.

The invention claimed is:

1. A method of providing content via a mobile cellular communications network to a user terminal, the method comprising:
    establishing, in a procedure initiated by the user terminal, a connection between the user terminal and a base station of the mobile cellular communications network, wherein the base station is configured to authenticate devices to access the mobile cellular communications network based on a pre-established relationship with an operator of the mobile cellular communications network;
    attempting, by the base station, to authenticate the user terminal;
    responsive to an inability to authenticate the user terminal, assigning by the base station a content access limitation to the user terminal, while establishing the connection between the user terminal and base station of the mobile cellular communications network, the content access limitation restricting content access by the user terminal to content of general public interest which is predefined on a network side; and
    providing the predefined content of general public interest to the user terminal.

2. The method of claim 1, wherein the assigning is performed to differentiate between user terminals with and without content access limitation.

3. The method of claim 1, further comprising:
    receiving, from the user terminal, after establishing the connection between the mobile terminal and the mobile communications network a request specifying content to be provided to the user terminal; and
    retrieving or requesting retrieval of predefined content matching the specified content for provision to the user terminal.

4. The method of claim 1, wherein establishing the connection between the mobile terminal and the mobile communications network pertains to a Packet Data Network connection setup.

5. The method of claim 4, wherein the assigning the content access limitation to the user terminal comprises allocating or triggering allocation of a dedicated PDN or a dedicated PDN function to the user terminal.

6. The method of claim 4, wherein the allocating or triggering allocation comprises notifying a gateway node interfacing one or more PDNs of the content access limitation underlying the PDN connection setup for the user terminal.

7. The method of claim 5, wherein the dedicated PDN is configured to provide only the predefined content to the user terminal.

8. The method of claim 5, wherein the dedicated PDN function is a filter that can only be passed by the predefined content.

9. The method of claim 1, wherein the assigning the content access limitation to the user terminal comprises allocating a dedicated bearer type to the user terminal.

10. The method of claim 1, wherein the assigning the content access limitation to the user terminal comprises allocating a connectivity limitation to the user terminal; the connectivity limitation restricting at least one of a Quality of Service, a bandwidth, a data volume, and a usage duration.

11. The method of claim 10, wherein a dedicated bearer is configured to enforce the connectivity limitation.

12. The method of claim 1, wherein the predefined content is provided to the user terminal via one or more broadcast messages.

13. The method of claim 1, wherein the predefined content is provided to the user terminal by an automated voice service via a circuit-switched connection.

14. The method of claim 1, further comprising determining a location of the user terminal, wherein the predefined content provided to the user terminal comprises content indicative of or selected based on the location.

15. The method of claim 14, wherein the location of the user terminal is determined based on at least one of:
    satellite positioning system data available for the user terminal;
    cell data of the mobile communications network available for the user terminal; and
    address data of the mobile communications network.

16. The method of claim 1, wherein the predefined content comprises one or more of map data, information pertaining to locally available services, Web pages, public warnings, and a weather forecast.

17. The method of claim 1, wherein said assigning is prior to authenticating the user terminal with the base station of the mobile cellular communications network.

18. A method of receiving content, via a mobile cellular communications network, at a user terminal, the method comprising:
    establishing, in a procedure initiated by the user terminal, a connection between the user terminal and a base station of the mobile cellular communications network;
    triggering, while establishing the connection between the mobile terminal and the base station of the mobile cellular communications network, assignment of a content access limitation to the user terminal, in response to an inability by the network to authenticate the user terminal based on a pre-established relationship with an operator of the mobile cellular communications network, the content access limitation restricting content access by the user terminal to content of general public interest which is predefined on a network side; and
    receiving the predefined content of general public interest via the mobile cellular communications network.

19. The method of claim 18, wherein the assignment of the content access limitation is triggered by transmitting a content access limitation indicator to the mobile communications network.

20. The method of claim 19, further comprising receiving a user interaction signal requesting or confirming the predefined content, wherein the content access limitation indicator is transmitted responsive to receipt of the user interaction signal.

21. A computer program product stored in a non-transitory computer readable medium for providing content via a mobile cellular communications network to a user terminal, the computer program product comprising software instructions which, when run on a processor of a network base station, causes the network base station to:
- establish, in a procedure initiated by the user terminal, a connection between the user terminal and the base station of the mobile cellular communications network, wherein the base station is configured to authenticate devices to access the mobile cellular communications network based on a pre-established relationship with an operator of the mobile cellular communications network;
- attempt to authenticate the user terminal;
- responsive to an inability to authenticate the user terminal, assign, while establishing the connection between the user terminal and the base station of the mobile cellular communications network, a content access limitation to the user terminal, the content access limitation restricting content access by the user terminal to content of general public interest which is predefined on a network side; and
- provide the predefined content of general public interest to the user terminal.

22. A computer program product stored in a non-transitory computer readable medium for receiving content, via a mobile cellular communications network, at a user terminal; the computer program product comprising software instructions which, when run on a processor of the user terminal, causes the user terminal to:
- establish, in a procedure initiated by the user terminal, a connection between the user terminal and a base station of the mobile cellular communications network;
- trigger, while establishing the connection between the user terminal and the mobile cellular communications network, assignment of a content access limitation to the user terminal, in response to an inability by the network to authenticate the user terminal based on a pre-established relationship with an operator of the mobile cellular communications network, the content access limitation restricting content access by the user terminal to content of general public interest which is predefined on a network side; and
- receive the predefined content of general public interest via the base station of the mobile cellular communications network.

23. A base station for providing content via a mobile cellular communications network to a user terminal, the base station comprising:
- a processor configured to:
  - establish, in a procedure initiated by the user terminal, a connection between the user terminal and the a base station of the mobile cellular communications network, wherein the base station is configured to authenticate devices to access the mobile cellular communications network based on a pre-established relationship with an operator of the mobile cellular communications network;
  - attempt to authenticate the user terminal;
  - responsive to an inability to authenticate the user terminal, assign, while establishing the connection between the user terminal and the base station of the mobile cellular communications network, a content access limitation to the user terminal, the content access limitation restricting content access by the user terminal to content of general public interest which is predefined on a network side; and
- an interface configured to provide the predefined content of general public interest to the user terminal.

24. A user terminal for receiving content via a base station of a mobile cellular communications network, the user terminal comprising:
- a processor configured to:
  - establish, in a procedure initiated by the user terminal, a connection between the user terminal and the base station of the mobile cellular communications network; and
  - trigger, while establishing the connection between the user terminal and the base station of the mobile cellular communications network, an assignment of a content access limitation to the user terminal in response to an inability by the network to authenticate the user terminal based on a pre-established relationship with an operator of the mobile cellular communications network, the content access limitation restricting content access by the user terminal to content of general public interest which is predefined on a network side; and
- an interface configured to receive the predefined content of general public interest via the mobile cellular communications network.

* * * * *

UNITED STATES PATENT AND TRADEMARK OFFICE
CERTIFICATE OF CORRECTION

PATENT NO. : 10,587,532 B2
APPLICATION NO. : 15/033674
DATED : March 10, 2020
INVENTOR(S) : Gòdor et al.

Page 1 of 1

It is certified that error appears in the above-identified patent and that said Letters Patent is hereby corrected as shown below:

On the Title Page

Item (72), under "Inventor", in Column 1, Line 1, delete "Kecskemet (HU)" and insert -- Kecskemét (HU) --, therefor.

In the Specification

Column 4, Line 40, delete "comprised by" and insert -- comprised of --, therefor.

Column 5, Line 11, delete "is signalling" and insert -- is a signalling --, therefor.

Column 6, Line 31, delete "mobile terminal 100," and insert -- mobile terminal 110, --, therefor.

Column 9, Line 56, delete "practise" and insert -- practice --, therefor.

Column 10, Line 55, delete "Complete" and insert -- complete --, therefor.

Column 10, Line 60, delete "8)" and insert -- 8 --, therefor.

Column 12, Line 45, delete "marcro-GSM" and insert -- macro-GSM --, therefor.

In the Claims

Column 16, Line 6, in Claim 23, delete "the a" and insert -- the --, therefor.

Signed and Sealed this
Twenty-third Day of June, 2020

Andrei Iancu
*Director of the United States Patent and Trademark Office*